May 27, 1958 N. STEINHILBER 2,835,997
ART OF FORMING FLAKES
Filed April 7, 1952
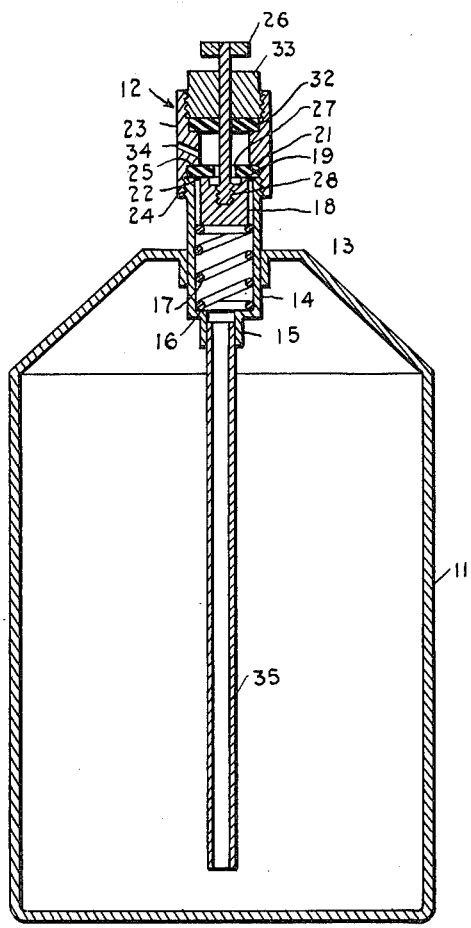
INVENTOR
NORMAN STEINHILBER
BY Arthur P. Cyr
ATTORNEY

United States Patent Office 2,835,997
Patented May 27, 1958

2,835,997

ART OF FORMING FLAKES

Norman Steinhilber, Flushing, N. Y., assignor, by mesne assignments, to American Home Products Corporation, New York, N. Y., a corporation of Delaware Application April 7, 1952, Serial No. 280,920

1 Claim. (Cl. 41—34)

This invention relates to a method and article of manufacture for forming a dry, flaky slightly adherent substance which may be colored for decorative purposes.

As conducive to an understanding of the invention, it is noted that in the decoration of Christmas trees, for example, where flakes of conventional type are sifted over the branches to simulate snow, many of such flakes will fall to the floor causing an untidy appearance and a relatively large quantity of flakes are required even for a small tree. In addition, many such flakes do not stick tightly to the branches and they are easily dislodged therefrom and will fall off leaving numerous uncovered areas.

It is accordingly among the objects of the invention to provide a method and article of manufacture for forming a dry, flaky substance which utilizes relatively inexpensive chemicals and simple equipment and which will leave a residue that will quickly dry in flake-like form upon spraying in air and when sprayed on an object will adhere thereto and provide a coating that is snow-like in appearance.

According to the invention, these objects are accomplished by the arrangement and combination of elements hereinafter described and particularly recited in the claims.

In the accompanying drawing the single figure illustrates one of various possible types of containers in which the solution to be dispersed may be confined.

According to the invention, the material to be dispersed is a synthetic resin such as a member of the acryloid group. Preferably, "Acryloid B-72," which is a copolymer of a mixture of an acrylic ester and a methacrylic ester, is used. This synthetic resin, a copolymer of methyl acrylate and ethyl methacrylate, is commercially available from Rohm & Haas Company of Philadelphia, Pennsylvania, and when dissolved at 40 percent solids concentration in toluol yields a solution having the following characteristic properties:

Specific gravity (25° C.)_____ 0.97.
Refractive index (25° C.)_____ 1.489.
Viscosity (30° C.)_____ 480–640 centipoises.
Flash point, closed cup (tag)_____ 39° F.

The copolymer forms water white, transparent films softening at 35–55° C., of refractive index 1.482 and having a specific gravity of 1.15 at 25° C. This synthetic resin has been found to give satisfactory results in the concentration within the range of 6% to 16%. The solvent which must also act as a propellant should be of a non-inflammable nature, and such solvent propellants have been found in the Freon group, which are halogenated hydrocarbons containing one or two carbon atoms in the molecule and having one or more fluorine atoms. It has been found that "Genetron 102-J" will give good results. This is a mixture of fluorinated chlorinated ethane and methane, more particularly 8% trichloromonofluoromethane (Freon 11), 16% dichlorodifluoromethane (Freon 12) and 76% 1,1,1,difluorochloroethane. It has also been found that a mixture of Freon 11, Freon 12 and Freon 22 will give satisfactory results.

*Example I*

Genetron 102-J_____percent__ 90
Acryloid B-72_____percent by weight__ 10

*Example II*

| | Percent |
|---|---|
| Freon (F11) trichloromonofluoromethane | 55 |
| Freon (F12) dichlorodifluoromethane | 35 |
| Freon (F22) difluorochloromethane | 10 |

This solvent mixture is made up under pressure and there is dissolved therein 7% by weight Acryloid B-72, that is a 7% solid plastic and 93% solvent.

*Example III*

Another solvent that has been found to give satisfactory results is a mixture of:

| | Percent |
|---|---|
| Freon (F11) trichloromonofluoromethane | 47½ |
| Freon (F12) dichlorodifluoromethane | 47½ |
| Freon (F22) difluorochloromethane | 5 |

Although any suitable receptacle may be used for the solution, set out in Examples I, II and III, in the embodiment herein shown, it desirably comprises a container 11, preferably of steel or other metal capable of withstanding relatively high pressure.

The container 11 has a valve assembly 12 mounted on the top wall 13 thereof which desirably comprises a casing 14 preferably cylindrical in shape, having a reduced root end 15 forming a shoulder 16 on which is seated a spring 17. Although the casing 14 may be affixed to the container wall 13 in any suitable manner, it desirably extends axially through an opening in said wall and is affixed thereto as by welding.

A valve closure 18 having a diameter sufficiently smaller than that of said casing to permit slidable movement of said closure member, has a cup portion 19 at the upper end thereof normally urged to seat against a compressible gasket 21 preferably of rubber or other flexible material, by means of coil spring 17 on which said closure member rests.

The gasket 21 is securely retained on the upper end 22 of the casing 14 by means of a sleeve 23 having an internally threaded portion 24 which coacts with the correspondingly threaded exterior of casing 14, said sleeve having an internal shoulder 25 which clamps said gasket on end 22 of the casing. Extending axially through sleeve 23 is a valve stem 26, one end of which extends through the central opening 27 of gasket 21 and is screwed in a threaded opening 28 in valve member 18. The other end of stem 26 extends through a gasket 31 seated on a shoulder 32 in said stem and retained on said shoulder by a plug 33 through which said stem extends. The sleeve has a relatively small opening 34 defining a nozzle through which the contents of the container may be ejected.

The casing 14 has a narrow pipe 35 telescoped therein at its lower end which extends to nearly the bottom of the container 11 so that the solution therein will be discharged through said pipe to the outlet nozzle 34.

The container 11 is charged with the Acryloid B-72 polymer, which is in solid crystalline form and the solvent is thereupon introduced into the container which is then sealed.

It has been found that in order to have substantially no undissolved materials in the solution, not more than 16% of the latter should be Acryloid B-72. If more than this quantity is used the undissolved particles might clog the relatively small nozzle of the valve. Due to the high vapor pressure of the solvents used which will boil at room temperature, a high pressure will be developed in the container. Thus, upon actuation by pressing down the valve stem 26, the solution of the copolymer and the solvent will emerge from the nozzle 34 in the form of an aerosol. If it is desired to produce a solid material in a more massive form, so as to imitate either snow balls or icicles, a change in the nozzle and an increase of the percentage of the Acryloid B-72 will allow the production of such an article.

The product may be colored, using any of the oil soluble colors and a fluorescent material may also be used. It has been found therefore that a phosphorescent pigment may be added which will allow the product to glow in the dark.

In addition, an oil soluble odoriferous material, such as pine oil, has been found to give the product an added attractive appeal.

The droplets of solution emerging from the nozzle will do so at relatively high velocity. Due to the high vapor pressure of the solvent it will evaporate almost as soon as it emerges from the nozzle and the residue of the copolymer will remain. This residue will be flaky in appearance and although the crystals of the copolymer are colorless the residue will be white in appearance resembling flakes of natural snow.

The spray may readily be used to decorate a Christmas tree, for example. For this purpose if the nozzle 34 is held near the branches of the tree and the valve stem 26 is actuated, the droplets of solution will strike the branches and the solvent will quickly evaporate leaving the white flaky residue which will adhere to the branches and remain thereon. If some of the sprayed material should not strike the branches but drop to the floor, as the solution would have completely evaporated before the flaky residue had fallen all the way, it could readily be brushed off the floor as it would not adhere thereto.

It is of course to be understood that the spray could be used for many other purposes. Thus, for example, a design can be sprayed on any surface such as a store window, a mirror, or the like, and letters and numerals can also be formed on such surfaces. As the residue is only lightly bonded to the surface it may readily be scraped therefrom.

As many changes could be made in the above method as well as in the solution and equipment and many apparently widely different embodiments of this invention could be made without departing from the scope of the claim, it is intended that all matter contained in the above description or shown in the accompanying drawing, shall be interpreted as illustrative and not in a limiting sense.

This application is a continuation-in-part of my prior application Serial No. 241,867, filed August 14, 1951, now Patent No. 2,803,906 issued August 27, 1957.

What is claimed is:

The method of applying to a surface to be decorated a dry, flaky, slightly adherent substance of crystalline appearance which, when present on said surface, simulates flakes of natural snow, said method comprising directing against said surface a spray of a solution of a synthetic resin in a solvent therefor, said synthetic resin being present therein in a concentration of about 7 percent by weight, based on the total weight of said solution, and said solvent being selected from the group which consists of: a mixture of 55 percent trichloromonofluoromethane, 35 percent dichlorodifluoromethane and 10 percent difluorochloromethane; and a mixture of 47.5 percent trichloromonofluoromethane, 47.5 percent dichlorodifluoromethane and 5 percent difluorochloromethane; said solvent being characterized by a relatively high vapor pressure at normal room temperature such as to result in the expulsion of droplets of said solution when a closed container containing said solution is opened thereby permitting contact between said solution and the outer atmosphere through an opening of restricted cross-sectional area; the vapor pressure of said solvent, at normal room temperature, being such that rapid evaporation thereof occurs leaving behind on said surface a solid residue of said synthetic resin; and said synthetic resin consisting of a copolymer of a mixture of methyl acrylate and ethyl methacrylate, said synthetic resin being capable of forming water white, transparent films of specific gravity (25° C.) 1.15; refractive index 1.482; and softening temperature 35–55° C.; said resin being further characterized by the following properties when dissolved in 40 percent solids concentration in toluol: specific gravity (25° C.) 0.97; refractive index (25° C.) 1.489; viscosity (30° C.) 480–640 centipoises; and flash point as determined in a closed cup (Tag), 39° F.

References Cited in the file of this patent

UNITED STATES PATENTS

| | | |
|---|---|---|
| 1,892,750 | Rotheim | Jan. 3, 1933 |
| 1,945,998 | Rotheim | Feb. 6, 1934 |
| 2,440,915 | Roehr | May 4, 1948 |
| 2,515,250 | McIntire | July 18, 1950 |
| 2,529,092 | Lodes | Nov. 7, 1950 |
| 2,617,780 | Lutz | Nov. 11, 1952 |

OTHER REFERENCES

Condensed Chemical Dictionary, Reinhold Pub. Co., N. Y., 3rd ed., 1942, page 49.